United States Patent Office 3,367,800
Patented Feb. 6, 1968

3,367,800
HIGH ENERGY-DENSITY HEAT-ACTIVATED VOLTAIC CELLS AT INTERMEDIATE TEMPERATURES
Richard E. Panzer, Riverside, Calif., assignor to the United States of America as represented by the Secretary of the Navy
No Drawing. Filed Sept. 28, 1964, Ser. No. 399,942
7 Claims. (Cl. 136—83)

ABSTRACT OF THE DISCLOSURE

A high energy-density heat-activated voltaic cell system using new combinations of electrode materials and molten salt electrolytes to obtain high outputs at relatively low temperatures, operating at a temperature range of 150° C. to 300° C. with the optimum temperature being around 200° C.

The invention herein described may be manufactured and used by or for the Government of the United States of America for governmental purposes without the payment of any royalties thereon or therefor.

The present invention relates to thermal battery cells where the electrolyte is solid and non-conductive at normal temperatures, but which becomes conductive when the electrolyte is melted. More specifically this invention relates to the use of new combinations of electrode materials and molten salt electrolytes in order to achieve cell current and voltage outputs at least comparable to those obtained from previously known thermal batteries but at as much as 200° C. or more lower operating temperature level.

Various electrochemical systems are known for use in thermal cells. Thermal batteries in the past have utilized salt mixtures melting in the range of 340° to 355° C. for instance. These were mixtures of alkali metal halides such as lithium, sodium and potassium chlorides, and bromides. Obviously the use of such mixtures at such high temperatures precluded the use of anode metals such as lithium, having a melting point of 177° C. or even many alloys containing a majority of lithium, sodium, potassium, calcium or magnesium unless the anode could remain solid throughout the operating temperature range of the cell. On the other hand, there are many active cathode materials (erroneously called "depolarizers" in many cases) which can only be used at low temperatures. Such materials as the peroxo uranium compound $H_4UO_6$ (peroxyuranic acid) and organic nitro compounds are unstable at the high temperatures formerly used. Additionally, the compound uranium trioxide, $UO_3$, which is used in the instant invention at high current densities and which is disclosed in copending application Ser. No. 168,850, filed Jan. 25, 1962, now U.S. Patent No. 3,189,485 issued June 15, 1965, has been found to operate significantly better at lower temperatures. This is apparently due to a high negative temperature coefficient of EMF. Other materials such as calcium chromate do not display this high negative coefficient and do not perform as well at low temperatures as they do at higher ones.

It has been found in the instant case that if certain combinations of materials are made up in a proper configuration for a thermally activated cell, a much higher output is achieved at temperatures lower than have previously been used. Ubbelohde and Rogers have disclosed the use of molten thiocyanates in their British Patent No. 865,810 of Apr. 19, 1961 but use no "depolarizer" and only single salts. Meyers, in U.S. Patent No. 3,083,252 has disclosed the use of thiocyanates dissolved in liquid ammonia to form the cell electrolyte. Meyers also suggests the use of alloys, but his use is always based on their use in liquid ammonia and as such would have little adaptability to molten salt systems without major changes in composition. Further, Robinson in U.S. Patent No. 2,631,180 has disclosed the use of various cathode materials such as $PbO_2$ and high oxide materials such as bismuth pentoxide. However, in most such cases, these materials can not be used in heat activated cells, since they decompose readily. Robinson's disclosure is predicated on their use in an aqueous moistening liquid-type cell and not to nonaqueous high temperature fused systems. Zellhoefer in U.S. Patent No. 3,110,632 has advanced the use of alloys of light metals, notably lithium, magnesium and aluminum for use in thermally activated cells, but he requires their use in high temperature systems in the halide melts to prevent the formation of liquid calcium-lithium alloys which form at these operating temperatures. This is not a problem in the low temperature cells, since other metals and alloys with higher potentials may be used in the latter case, and the formation of liquid alloys is not observed.

In the instant invention, the advantages of the combinations of electrode materials and fused electrolytes are that current densities and voltages, previously obtainable only at operating temperatures above 425° C., are produced at temperatures from 150° C. to 300° C., the optimum temperature being around 200° C. This means that much less thermal insulation is required to maintain the cell in a molten activated state and much less chemical heating materials is required for the activation. These reductions in essentially non-productive components of the battery allow more electrochemical energy productive components to be included in a battery and a much higher energy density per pound of total weight is achieved.

It is an object of the invention therefore to provide improved thermal battery cells.

Another object of the invention is to provide novel heat activated battery cells that require less heat for activation and whose electrolyte will remain molten at substantially lower temperatures than heretofore.

A further object of the invention is to provide a novel thermal battery which produces a much higher energy density per pound of total weight of productive components than heretofore.

Other objects and many of the attendant advantages of this invention will become readily appreciated as the same becomes better understood by reference to the following detailed description.

The instant invention may be practiced according to the description of some suggested electrochemical cells, given by way of example, as follows:

In Table I, below, are listed a number of suggested configurations of electrochemical cells and their observed outputs. The invention is not limited to merely those specific examples listed since they are merely representative, over a wide range, of the variety of cells that can be made by means of the present teachings.

TABLE I.—TYPICAL CONFIGURATIONS AND OPERATING PARAMETERS OF SELECTED THERMALLY-ACTIVATED VOLTAIC CELLS.

[All cells were activated under load and discharged between peak and final voltages for a minimum of 300 sec.]

| Configuration [a] | PCCV [c] (volts) | FCCV [d] (volts) | Cur. Dens. (ma./cm.²) | Temp. (° C.) |
|---|---|---|---|---|
| Li 20 wt. percent Zn/KSCN-LiBr, Al₂O₃//UO₃, KSCN-LiBr/Ni | 2.20 | 1.66 | 37 | 250 |
| Li 25 wt. percent Mg/KSCN-NaSCN-NaCl, Al₂O₃//H₄UO₆+electrolyte [b]/Ni | 1.95 | 1.35 | 45 | 150 |
| Li/KSCN-NaSCN-NaCl, Al₂O₃//Na-dinitrobenzoate+electrolyte [b]/Ni | 1.87 | 1.41 | 45 | 150 |
| Li 90 wt. percent Pb/KSCN-NaSCN Kaolin//Na-dinitrobenzoate+electrolyte [b]/Ni | 1.57 | 1.07 | 39 | 200 |
| Li 25 wt. percent Mg/KSCN-NaSCN, Kaolin//UO₃+electrolyte [b]/Ni | 2.59 | 2.01 | 74 | 200 |
| Li 50 wt. percent Mg/KSCN-NaSCN-NaCl, Kaolin//V₂O₅+electrolyte [b]/Ni [e] | 2.47 | 1.75 | 74 | 250 |
| Li 50 wt. percent Mg/KSCN-NaSCN-NaCl, Kaolin//UO₃+electrolyte [b]/Ni | 2.35 | 1.81 | 73 | 250 |
| Li 25 wt. percent Mg/KSCN-LiBr-Kaolin//KSCN-LiBr-CaCrO₄/Ni | 1.68 | .72 | 88 | 300 |
| Li 20 wt. percent Ca/KSCN-LiBr-Kaolin//KSCN-LiBr-AgBr/Ni | 1.96 | 1.10 | 111 | 300 |

[a] Anode/electrolyte (anolyte), inert absorbent//active cathode material+electrolyte/cathector (cathode electron connector).
[b] Electrolyte used on the cathode side of cells is the same as that listed on the anolyte side, but with no absorbent except the active cathode material (i.e., UO₃, V₂O₅, etc.).
[c] PCCV is the peak closed circuit voltage.
[d] FCCV is the final closed circuit voltage measured 300 sec. after the cell output reached the PCCV voltage.
[e] Dry inert atmosphere, all others were operated in ambient atmosphere.

In a preferred embodiment the anode metal or alloy is pressed onto a nickel (or other suitable metal which is non-reactive with the electrolyte) strip so as to give a small disk of the active alloy which adheres to the strip. In the case of the lithium-lead alloy which exists as a brittle granular material a portion of the alloy is pressed under 20 tons pressure to give a coherent disk which may be used in contact with a nickel strip anode electron collector (anector). The alloy is thus the anode or negative electrode. A preferred electroyte is a mixture of potassium and sodium thiocyanates which forms a eutectic (lowest melting) mixture. The composition is 73 weight percent KSCN, 27 weight percent NaSCN melting point, 123.4° C. It was found that far better performance is obtained from the cells of a halide is added to the thiocyanate mixture before melting. It was also found that a mixture of 90 weight percent of the thiocyanate eutectic and 10 weight percent of either lithium bromide or sodium chloride gave excellent results compared to cells where no additive halide was used. In other words, for high energy density a halide is necessary. In order to better retain the electrolyte mixture in the space between the electrodes it may be mixed with 35 weight percent dry kaolin or a light density alumina and then compressed under 100,000 p.s.i. in a die to give an anolyte disk which may easily be handled. The active cathode material is typically a dry non-reactive powder which serves in place of the kaolin to retain the electrolyte on the cathode side in addition to its usual function. The anolyte disk is placed next to the anode metal, the catholyte disk is placed next to a thin strip of nickel or stainless steel (the cathector). Upon activating the cell, applied heat melts the electrolyte which moistens the kaolin and the active cathode material and is partially absorbed therein. In a conventional cell the absorbent may be dispensed with, if desired. The cell output depends on the active cathode material more than it does on the anode metal or alloy used. As can be seen from Table I, many cell configurations have been made, those listed being merely typical examples. It was found that for cells operating above 200° C., a 50—50 weight percent lithium-magnesium alloy was necessary because one with more lithium melted at about 200° C. The use of the sodium salt of 3,5 dinitrobenzoic acid in a thermal cell is new. Such a compound, in which the nitro groups are reduced during the cell discharge, may be used only if it has a melting or decomposition point well above the operating temperature range of the cell. It was therefore necessary to prepare the sodium salts of the acids in order to raise the melting points.

Many combinations are possible which would include the basic discoveries taught herein. These would include the organic nitro compounds, the specific alloy anodes developed for use over the temperature range 125–300° C, with the alkali thiocyanate fused electrolyte mixtures to which an alkali halide has been added. In the present case, following the accepted practice, the anode is always the electrode at which oxidation takes place and the cathode is always the electrode at which the reduction takes place. The potential sign of the electrodes may vary according to whether the cell is driven by an outside source of current or is itself the source of that current.

The use of mixtures of thiocyanates, the use of halide additives, the use of organic nitro compounds with fused salts, the use of lithium alloys specially designed to operate at the temperatures of the fused thiocyanates without reacting with the salts themselves, the use of uranium trioxide or peroxyuranic acid, and the use of other inorganic oxidents such as chromates, oxides and silver salts; all these contribute to the operation of fused salt voltaic cells at high energy density of a level previously obtainable only at temperatures at least 200 degrees higher than the optimum temperature at which the cells of the present invention operate.

Obviously many modifications and variations of the present invention are possible in the light of the above teachings. It is therefore to be understood that within the scope of the appended claims the invention may be practiced otherwise than as specifically described.

What is claimed is:

1. A high energy-density heat-activated voltaic cell system comprising:
   (a) an anode consisting of an alloy of lithium containing up to 100% lithium and of such a composition that its melting point is above the operating temperature of the voltaic cell,
   (b) a fused salt electrolyte consisting of mixtures of at least one alkali metal thiocyanate with an alkali metal halide,
   (c) a cathode consisting of an oxidant material selected from $UO_3$, $H_4UO_6$, $V_2O_5$, AgBr. calcium chromate and dinitrobenzoate compounds whose melting and decomposition points are above the operating temperatures of the cell electrolyte,
   (d) said voltaic cell operable to be activated within a temperature range of 125° to 300° C with the decomposition point of the components determining the optimum operating temperatures.

2. A voltaic cell system as in claim 1 wherein an inert absorbent is used to immobilize the electrolyte when in its molten state.

3. A voltaic cell system as in claim 1 wherein said fused salt electrolyte consists of a mixture of an alkali metal thiocyanate eutectic and an alkali metal halide.

4. A voltaic cell system as in claim 1 consisting of mixtures of approximately 90% alkali metal thiocyanates with approximately 10% of an alkali metal halide.

5. A voltaic cell system as in claim 1 wherein said fused salt electrolyte consists of mixtures of at least two alkali metal thiocyanates with an alkali metal halide.

6. A voltaic cell system as in claim 1 wherein approximately 35% by weight of kaolin is added to said electrolyte as an inert immobilzer.

7. A voltaic cell system as in claim 1 wherein approximately 35% by weight of $Al_2O_3$ is added to said electrolyte as an inert immobilizer.

References Cited

UNITED STATES PATENTS

| | | | |
|---|---|---|---|
| 3,244,564 | 4/1966 | Fox | 136—158 X |
| 3,311,503 | 3/1967 | Zellhoefer | 136—83.1 |

FOREIGN PATENTS

| | | |
|---|---|---|
| 1,126,464 | 3/1962 | Germany. |
| 865,810 | 4/1961 | Great Britain. |

OTHER REFERENCES

Uhler et al., New Cathode-Anode Couples for Secondary Batteries, in ASTIA, Wadd Tech. Report AD 268,267 4/1961 (Only pp. 28, 41, 46 relied on).

ALLEN B. CURTIS, *Primary Examiner.*